(12) United States Patent
Ho et al.

(10) Patent No.: US 11,223,511 B2
(45) Date of Patent: *Jan. 11, 2022

(54) TELEPHONE WITH A UNIVERSAL PHONE NUMBER

(71) Applicant: TP Lab Inc., Palo Alto, CA (US)

(72) Inventors: Chi Fai Ho, Palo Alto, CA (US); Shin Cheung Simon Chiu, Palo Alto, CA (US)

(73) Assignee: TP Lab Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,229

(22) Filed: Apr. 23, 2018

(65) Prior Publication Data

US 2018/0241607 A1  Aug. 23, 2018

Related U.S. Application Data

(63) Continuation of application No. 11/559,570, filed on Nov. 14, 2006, now Pat. No. 9,985,817.

(51) Int. Cl.
*H04M 7/00* (2006.01)
*H04L 12/66* (2006.01)
(Continued)

(52) U.S. Cl.
CPC .. *H04L 29/12122* (2013.01); *H04L 29/12584* (2013.01); *H04L 61/1547* (2013.01);
(Continued)

(58) Field of Classification Search
CPC .... H04M 3/2218; H04M 15/41; H04M 15/58; H04M 3/38; H04M 3/42059;
(Continued)

(56) References Cited

U.S. PATENT DOCUMENTS 5,329,578 A * 7/1994 Brennan .......... H04M 3/42229
379/196
5,339,356 A    8/1994 Ishii
(Continued)

FOREIGN PATENT DOCUMENTS

WO    2000041486 A2    7/2000
WO    2005084128 A2    9/2005

OTHER PUBLICATIONS

Office Action for corresponding U.S. Appl. No. 11/559,570, 12 pages, dated Jul. 30, 2010.
(Continued)

*Primary Examiner* — Ahmad F. Matar
*Assistant Examiner* — Kharye Pope
(74) *Attorney, Agent, or Firm* — North Shore Patents, P.C.; Michele Liu Baillie

(57) ABSTRACT

A universal phone number service and method of providing a universal phone number service that allows a user to receive phone calls on any phone service with a single phone number. A telephone is disclosed that is associated with more than one phone number and a universal phone number, wherein any phone call placed to the universal phone number results in the call being completed to the telephone regardless of the service associated with the more than one phone number.

7 Claims, 6 Drawing Sheets

(51) Int. Cl.
*H04L 29/12* (2006.01)
*H04M 3/42* (2006.01)

(52) U.S. Cl.
CPC .... *H04L 61/2596* (2013.01); *H04M 3/42229* (2013.01); *H04Q 2213/13034* (2013.01); *H04Q 2213/13097* (2013.01); *H04Q 2213/13098* (2013.01); *H04Q 2213/13196* (2013.01); *H04Q 2213/13389* (2013.01)

(58) Field of Classification Search
CPC ......... H04M 3/42042; H04M 15/8044; H04M 2250/60; H04M 15/44; H04M 15/60; H04M 2203/551; H04M 2215/0164; H04M 15/8016; H04W 4/24; H04W 88/16; H04W 8/02; H04W 8/06; H04W 8/04; H04W 8/18; H04L 67/22; H04L 65/1069; H04L 12/14; H04L 12/1403; H04L 12/1482
USPC .............................. 455/406, 433; 370/352
See application file for complete search history.

(56) References Cited

U.S. PATENT DOCUMENTS

| | | | |
|---|---|---|---|
| 5,371,781 A | 12/1994 | Ardon | |
| 5,553,124 A | 9/1996 | Brinskele | |
| 5,742,905 A | 4/1998 | Pepe et al. | |
| 5,764,730 A | 6/1998 | Rabe | |
| 5,933,785 A * | 8/1999 | Tayloe | H04W 8/26 455/558 |
| 5,983,095 A | 11/1999 | Cameron | |
| 6,064,653 A * | 5/2000 | Farris | H04L 12/6418 370/237 |
| 6,163,602 A * | 12/2000 | Hammond | G01D 4/004 379/106.01 |
| 6,311,063 B1 * | 10/2001 | Valliani | H04M 15/00 455/414.1 |
| 6,389,117 B1 * | 5/2002 | Gross | H04M 3/42127 379/201.01 |
| 6,404,864 B1 | 6/2002 | Evslin | |
| 6,526,272 B1 | 2/2003 | Bansal | |
| 6,574,216 B1 | 6/2003 | Farris | |
| 6,697,474 B1 * | 2/2004 | Hanson | H04L 29/06 379/201.01 |
| 6,760,312 B1 | 7/2004 | Hitzeman | |
| 6,778,640 B1 | 8/2004 | Zhang et al. | |
| 6,829,335 B2 | 12/2004 | Colemon | |
| 6,853,851 B1 * | 2/2005 | Rautiola | H04M 1/725 455/426.1 |
| 6,868,080 B1 | 3/2005 | Umansky | |
| 6,931,116 B1 * | 8/2005 | Gross | H04M 3/46 379/201.02 |
| 7,113,805 B1 * | 9/2006 | Schwarz | H04W 4/16 455/127.4 |
| 7,162,020 B1 | 1/2007 | Forte | |
| 7,184,782 B1 * | 2/2007 | Ljungstrom | H04Q 3/005 455/461 |
| 7,212,622 B2 | 5/2007 | Delaney | |
| 7,369,539 B1 * | 5/2008 | Christie, IV | H04L 29/06 370/352 |
| 7,664,491 B2 * | 2/2010 | Vander Veen | H04M 3/54 455/414.1 |
| 7,929,955 B1 * | 4/2011 | Bonner | H04M 3/42068 455/414.1 |
| 8,107,957 B1 | 1/2012 | O'Neil et al. | |
| 2002/0061100 A1 | 5/2002 | DiCamillo et al. | |
| 2002/0122545 A1 | 9/2002 | Schwab et al. | |
| 2002/0198007 A1 | 12/2002 | Zimmerman | |
| 2003/0007625 A1 | 1/2003 | Pines | |
| 2003/0063733 A1 | 4/2003 | Levine et al. | |
| 2003/0119479 A1 | 6/2003 | Arima | |
| 2003/0125072 A1 | 7/2003 | Dent | |
| 2003/0144024 A1 | 7/2003 | Luo | |
| 2003/0198326 A1 * | 10/2003 | Wei | H04M 3/42229 379/142.14 |
| 2003/0228011 A1 | 12/2003 | Gibson | |
| 2004/0141604 A1 | 7/2004 | Shaffer et al. | |
| 2004/0153382 A1 * | 8/2004 | Boccuzzi | G06Q 30/04 705/34 |
| 2004/0170257 A1 | 9/2004 | Gross | |
| 2004/0174975 A1 | 9/2004 | Sylvain | |
| 2004/0174976 A1 | 9/2004 | Elliott | |
| 2004/0180676 A1 | 9/2004 | Haumont | |
| 2004/0196810 A1 | 10/2004 | Kil et al. | |
| 2004/0202305 A1 | 10/2004 | Brennan | |
| 2004/0203707 A1 | 10/2004 | Akhteruzzaman et al. | |
| 2004/0204119 A1 | 10/2004 | Ho | |
| 2004/0248593 A1 | 12/2004 | Hicks et al. | |
| 2005/0063529 A1 | 3/2005 | Meldrum et al. | |
| 2005/0069121 A1 | 3/2005 | Faruque et al. | |
| 2005/0096034 A1 | 5/2005 | Petermann | |
| 2005/0101291 A1 | 5/2005 | Scalisi | |
| 2005/0152521 A1 | 7/2005 | Liljestrand | |
| 2005/0163108 A1 | 7/2005 | Moore et al. | |
| 2005/0175165 A1 | 8/2005 | Holder | |
| 2005/0190747 A1 * | 9/2005 | Sindhwani | H04W 88/06 370/352 |
| 2005/0195954 A1 | 9/2005 | Klein | |
| 2005/0208957 A1 | 9/2005 | Knotts | |
| 2005/0215243 A1 * | 9/2005 | Black | H04M 1/006 455/417 |
| 2005/0287996 A1 | 12/2005 | Benco | |
| 2006/0002541 A1 | 1/2006 | Bettis et al. | |
| 2006/0025141 A1 | 2/2006 | Marsh | |
| 2006/0067506 A1 | 3/2006 | Flockhart et al. | |
| 2006/0079236 A1 * | 4/2006 | Del Pino | H04L 65/1016 455/445 |
| 2006/0089169 A1 * | 4/2006 | Tsao | H04W 52/0274 455/552.1 |
| 2006/0140200 A1 | 6/2006 | Black | |
| 2006/0206604 A1 | 9/2006 | O'Neil et al. | |
| 2006/0234693 A1 | 10/2006 | Isidore | |
| 2006/0268928 A1 * | 11/2006 | Barzegar | H04W 36/14 370/465 |
| 2006/0276193 A1 | 12/2006 | Itzkovitz et al. | |
| 2007/0015535 A1 * | 1/2007 | LaBauve | H04L 29/06027 455/552.1 |
| 2007/0032225 A1 * | 2/2007 | Konicek | F24F 11/30 455/417 |
| 2007/0041550 A1 | 2/2007 | McLarty et al. | |
| 2007/0071221 A1 | 3/2007 | Allen et al. | |
| 2007/0099638 A1 | 5/2007 | Voltz | |
| 2007/0105531 A1 | 5/2007 | Schroeder, Jr. | |
| 2007/0201432 A1 | 8/2007 | Sood | |
| 2007/0268858 A1 * | 11/2007 | Soto | H04L 65/104 370/328 |
| 2007/0280464 A1 | 12/2007 | Hughes et al. | |
| 2007/0287438 A1 | 12/2007 | Hansen | |
| 2008/0046580 A1 * | 2/2008 | Lafuente | H04M 15/8055 709/229 |
| 2008/0056208 A1 * | 3/2008 | Hinrikus | H04M 7/0057 370/338 |
| 2009/0028130 A1 | 1/2009 | Volkaerts et al. | |
| 2011/0200022 A1 * | 8/2011 | Annamalai | H04W 8/04 370/338 |
| 2014/0173078 A1 * | 6/2014 | McCord | G06Q 30/01 709/223 |

OTHER PUBLICATIONS

Office Action for corresponding U.S. Appl. No. 11/559,570, 13 pages, dated Dec. 22, 2010.
Office Action for corresponding U.S. Appl. No. 11/559,570, 12 pages, dated May 11, 2011.
Office Action for corresponding U.S. Appl. No. 11/559,570, 16 pages, dated Oct. 27, 2011.
Office Action for corresponding U.S. Appl. No. 11/559,570, 12 pages, dated Jun. 4, 2013.

(56) References Cited

OTHER PUBLICATIONS

Office Action for corresponding U.S. Appl. No. 11/559,570, 12 pages, dated Nov. 6, 2013.
Office Action for corresponding U.S. Appl. No. 11/559,570, 13 pages, dated Nov. 26, 2014.
Office Action for corresponding U.S. Appl. No. 11/559,570, 13 pages, dated Apr. 20, 2015.
Office Action for corresponding U.S. Appl. No. 11/559,570, 12 pages, dated Sep. 24, 2015.
Office Action for corresponding U.S. Appl. No. 11/559,570, 12 pages, dated Jan. 4, 2016.
Office Action for corresponding U.S. Appl. No. 11/559,570, 13 pages, dated Jul. 26, 2016.
Office Action for corresponding U.S. Appl. No. 11/559,570, 15 pages, dated Feb. 9, 2017.
Office Action for corresponding U.S. Appl. No. 11/559,570, 14 pages, dated Aug. 24, 2017.

* cited by examiner

TELEPHONE WITH A UNIVERSAL PHONE NUMBER

CROSS-REFERENCE TO RELATED APPLICATIONS

This is a continuation of U.S. patent application Ser. No. 11/559,570 filed Nov. 14, 2006, the entirety of which is incorporated herein by reference.

TECHNICAL FIELD

This invention relates generally to telecommunication, particularly to a system and method for providing a universal phone number service.

BACKGROUND

The proliferation of phone service, such as mobile phone service, Voice over IP (VoIP) service, SKYPE, or Instant Messaging (IM) based phone services such as those offered by Yahoo, MSN or Google, provides unprecedented convenience for a user to receive a phone call. For example, a user of a dual mode phone can receive a phone call from a mobile phone service while driving on a freeway and can receive another phone call from SKYPE service via a WiFi Hotspot while enjoying a relaxing afternoon in a downtown café.

Typically, each phone service is associated with a phone number with which a user receives the service. This nevertheless creates a profound problem for the user.

In one example, a user uses a WiFi-GSM dual mode phone to receive a GSM mobile phone service with a GSM phone number and Yahoo Phone In service with a Yahoo Phone In phone number. The user gives the GSM phone number to his stock broker while visiting his parents in a remote town in Kansas. The parents' house has broadband Internet access through the local cable company, but is outside of GSM signal coverage. The user uses his dual mode phone to sign on to Yahoo Phone In service using the broadband Internet access and is able to receive phone calls from his wife and children back home. Unfortunately, when his stock broker needs to consult with the user for an important stock purchase decision by dialing the GSM phone number, he is unable to reach the user.

In another example, a user uses a dual mode phone to receive a GSM mobile phone service, Yahoo Phone In service, SKYPE and two other phone services that are tailored to her participation in the local school and church. Each phone service is associated with a different phone number. A friend who knows only one of the five phone numbers can only reach the user if the associated phone service is available for her dual mode phone. A second friend who knows all five phone numbers will have to try calling the phone numbers one after another in order to reach the user.

Therefore, there is a need to provide a universal phone number service, that is, a service that allows a user to conveniently receive phone calls on any phone service with a single phone number.

SUMMARY OF THE INVENTION

In accordance with at least one aspect of the present invention a system is described for providing a universal phone number service having a universal phone number service gateway associated with at least one telephone system and a telephone associated with a universal phone number. In one embodiment the system includes a telephone connected to at least one telephone system to receive at least one phone service and is associated with at least one phone number for receiving the at least one phone service. In a preferred embodiment the telephone is connected to more than one telephone system, and the telephone is associated with more than one phone number.

In at least one embodiment a system is disclosed in which a universal phone number service gateway is provided that is associated with a datastore, the datastore optionally comprising a memory and optionally comprising a database. The datastore optionally further includes a route record associated with the universal phone number. The datastore may further include a subscriber record associated with the universal phone number, and the subscriber record preferably includes a phone number.

In another embodiment a method of routing a call to a telephone using a universal phone number is described whereby a telephone is connected to at least one telephone system to receive at least one phone service. Preferably the telephone is associated with a plurality of phone numbers, each of which is associated with a phone service. The universal telephone number is associated with the telephone and the telephone number(s), and calls destined for the universal telephone number are routed through a universal phone number service gateway using the telephone number to a telephone system associated with the telephone number. The universal phone number service gateway preferably routes a call to the telephone system using a standard-based protocol, a proprietary protocol, a corporate telephony trunking protocol or an Application Programming Interface.

In one embodiment the method includes creation of a route entry of a route record. In a preferred embodiment, the universal phone number service gateway connects to a datastore including the route record and a subscriber record, wherein the route record is associated with the universal phone number and the subscriber record is associated with the universal phone number and includes a phone number. In another embodiment, the method further includes obtaining an indication that the telephone system can route a phone call to the phone number; selecting a subscriber record based on the phone number; selecting a route record based on the universal phone number associated with the subscriber record; and creating a route entry in the route record. The route entry preferably includes the phone number and the identity of the telephone system.

Preferably the indication step takes place at the time of phone service subscription. However, this step may take place as further described herein.

In another embodiment the present invention includes a telephone associated with more than one phone number and a universal phone number, wherein any phone call placed to the universal phone number results in the call being completed to the telephone regardless of the service associated with the more than one phone number.

BRIEF DESCRIPTION OF DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for the purposes of explanation, specific numbers, materials and configurations are set forth in order to provide a thorough understanding of the invention. It will be apparent, however, to a person of ordinary skill in the art, that these specific details are merely exemplary embodiments of the invention. In some instances, well known features may be omitted or simplified so as not to obscure the present invention. Furthermore, reference in the specification to "one embodiment" or "an embodiment" is not meant to limit the scope of the invention, but instead merely provides an example of a particular feature, structure or characteristic of the invention described in connection with the embodiment. Insofar as various embodiments are described herein, the appearances of the phase "in an embodiment" in various places in the specification are not meant to refer to a single or same embodiment.

Figure 1:
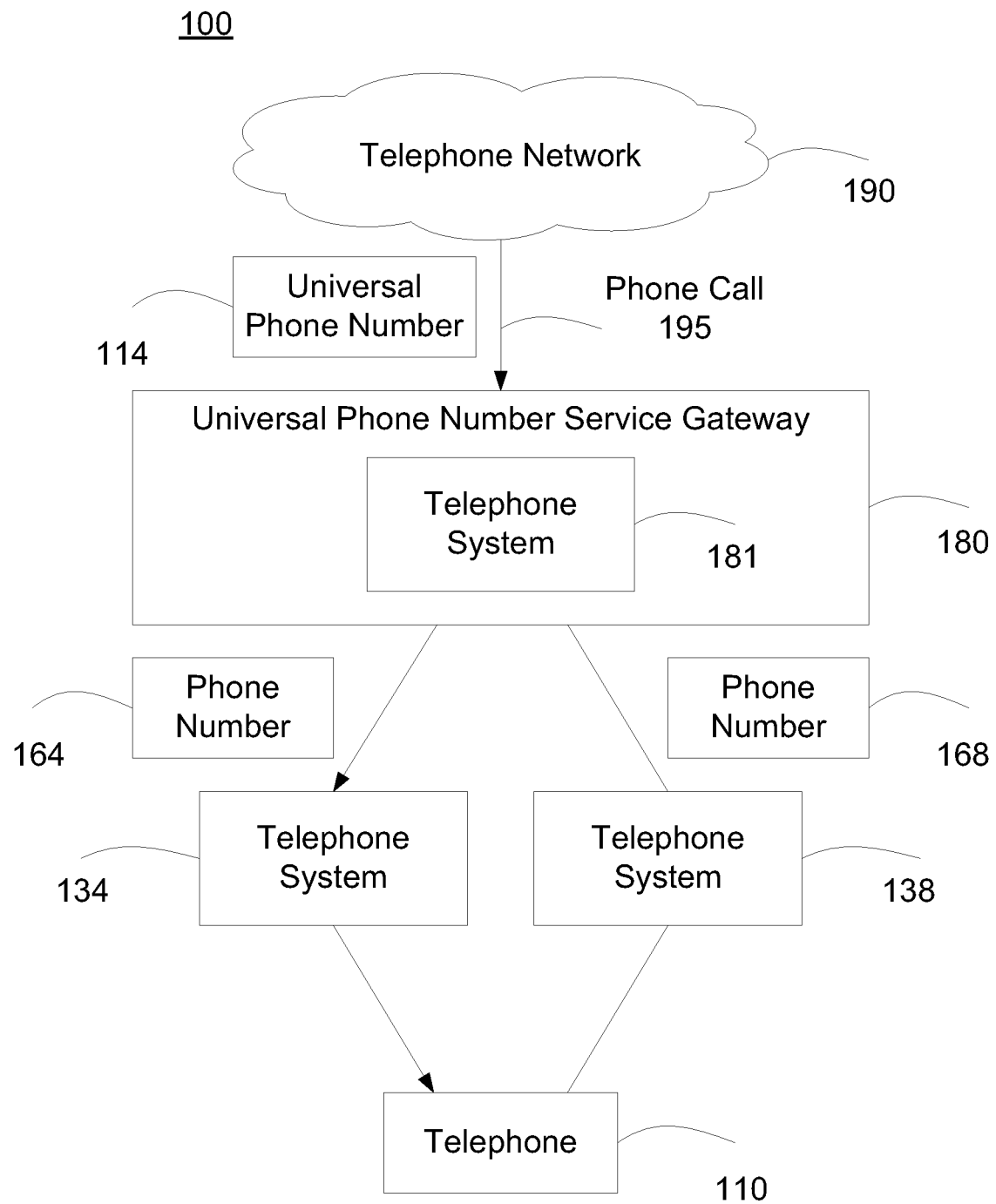
FIG. 1 illustrates a universal phone number service in accordance with at least one aspect of the present invention.

With reference to the drawings, wherein like numerals indicate like elements, there is shown in FIG. 1 in accordance with at least one embodiment, a simplified block diagram depicting a system 100 providing a universal phone number service, the system 100 including a universal phone number service gateway 180 associated with at least one telephone system and a telephone 110 associated with a universal phone number 114.

Telephone 110 is connected to at least one telephone system to receive at least one phone service and is associated with at least one phone number for receiving the at least one phone service. For example, telephone 110 connects to a first telephone system 134 to receive a first phone service, and is associated with a first phone number 164 for the first phone service. Telephone 110 connects to a second telephone system 138 to receive a second phone service and is associated with a second phone number 168 for the second phone service.

Telephone systems 134 and 138 are selected from, for example, a cellular phone system, such as a Global Service for Mobile Communications (GSM) system, or a W-CDMA (Wideband Code Division Multiple Access) system; a Voice over IP (VoIP) phone system; an Instant Message (IM) based phone system, such as, but not limited to Yahoo Phone In service; a public phone system; a corporate phone system; or a residential phone system.

A universal phone number service gateway 180 connects to a telephone network 190. A phone call 195 through telephone network 190 destined to universal phone number 114 is routed to universal phone number service gateway 180. Telephone network 190 may be without limitation a public telephony network such as Public Switched Telephone Network (PSTN), Voice over IP network (VoIP), or cellular telephony network; a corporate telephone network; or an IM based telephone network. Universal phone number 114 may be a public telephone number; a corporate telephone number; or an IM user identity, such as, but not limited to a screen name or a user name.

Universal phone number service gateway 180 includes the functionality of a telephone system 181 for receiving and routing a phone call. Universal phone number service gateway 180 receives phone call 195 using telephone system 181.

In one embodiment, universal phone number service gateway 180 determines first telephone system 134 to route phone call 195. An example of a process of determining a telephone system to route a phone call is illustrated in FIG. 1. Universal phone number service gateway 180 routes phone call 195 to telephone system 134 using the first phone number 164. First telephone system 134 receives phone call 195. First telephone system 134 routes phone call 195 to telephone 110 based on first phone number 164. Routing phone call 195 to telephone 110 from telephone system 134 is well known to those skilled in the art.

Depending on the application and particular embodiment, a universal phone number service gateway 180 may route a phone call to a telephone system 134 or 138 using a standard-based protocol such as Integrated System Digital Network (ISDN) Primary Rate (PRI) protocol, Signaling System 7 (SS7) ISDN User Part (ISUP) protocol, or Session Initiation Protocol (SIP). In another embodiment, a universal phone number service gateway 180 may route a phone call to a telephone system 134 or 138 using a proprietary protocol, such as a SIP protocol extension, or a corporate telephony trunking protocol. In yet another embodiment, and not by way of limitation, a universal phone number service gateway 180 may route a phone call using an Application Programming Interface (API).

By way of example, a caller using a universal phone number service in accordance with the present invention may use universal phone number 114 to send a short message or a multimedia message. Telephone 110 sends the message through a universal phone number service gateway 180. In one embodiment, telephone 110 sends the message through first telephone system 134 to universal phone number service gateway 180.

In another embodiment, a short message or a multimedia message is sent to universal phone number 114. Universal phone number service gateway 180 delivers the message to telephone 110 as described herein. In another embodiment, universal phone number service gateway 180 delivers the message through second telephone system 138 to telephone 110.

Figure 2:
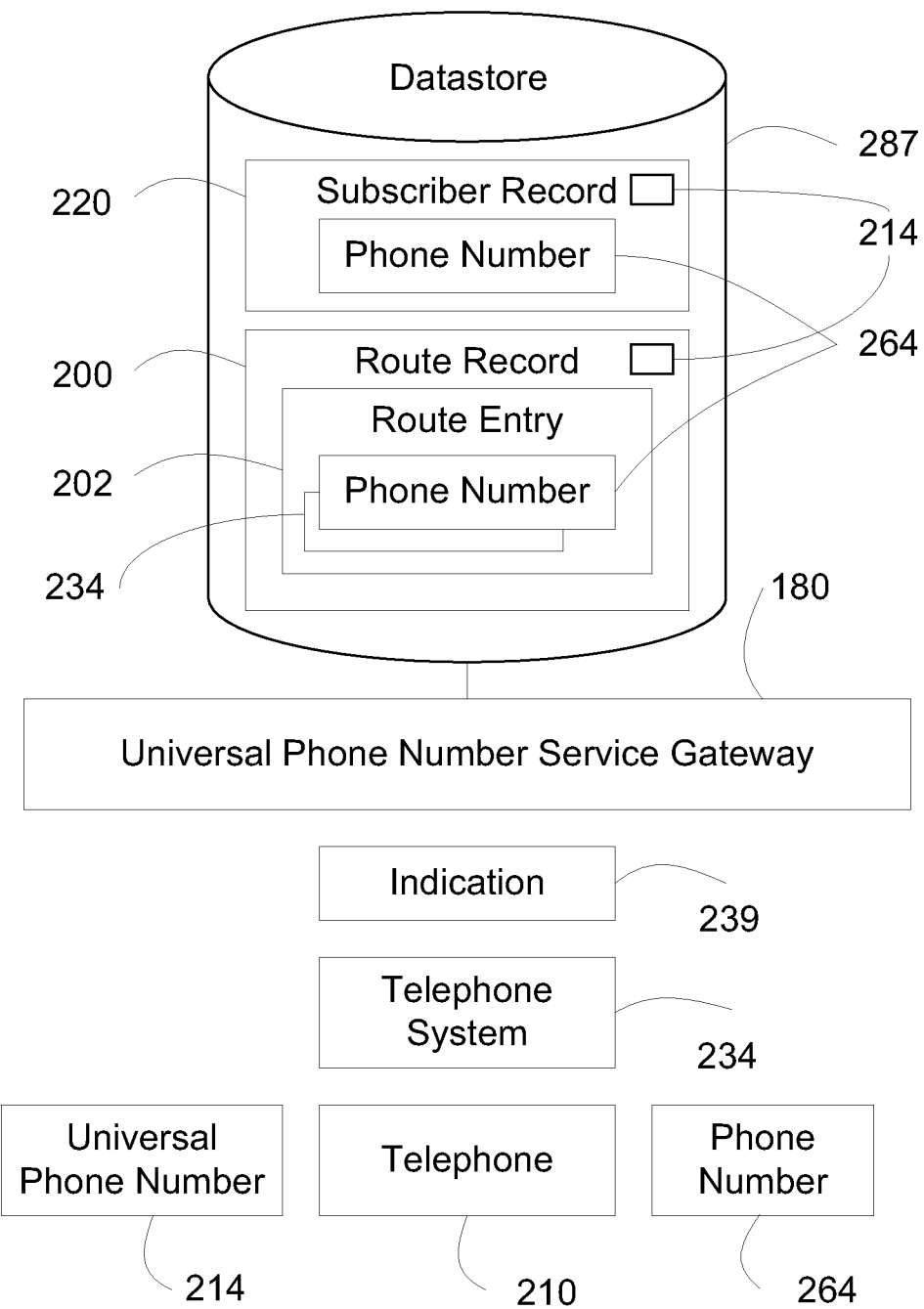
FIG. 2 illustrates a route entry of a route record in accordance with at least one aspect of the present invention.

Now referring to FIG. 2 a process for a universal phone number service gateway 180 to create a route entry 202 of a route record 200 is depicted.

In accordance with one embodiment telephone 210 is associated with universal phone number 214 for the universal phone number service 100. Telephone 210 is further associated with phone number 264 for receiving phone service from telephone system 234. Universal phone number service gateway 180 connects to a datastore 287. Datastore 287 may include a memory, a flash memory, a hard disk or the like. Datastore 287 may include a database. In one embodiment, universal phone number service gateway 180 includes datastore 287.

Datastore 287 preferably includes route record 200 and subscriber record 220. In one embodiment route record 200 is associated with universal phone number 214. Subscriber record 220 is associated with universal phone number 214 and includes phone number 264.

A universal phone number service gateway 180 obtains indication 239 that telephone system 234 can route a phone call to phone number 264. Universal phone number service gateway 180 selects subscriber record 220 based on phone number 264. Universal phone number service gateway 180 further selects route record 200 based on universal phone number 214 associated to subscriber record 220. Universal phone number service gateway 180 creates a route entry 202 in route record 200. Route entry 202 includes phone number 264 and identity of telephone system 234.

Universal phone number service gateway 180 may obtain indication 239 through a number of means. In one embodiment, telephone system 234 provides a phone service, such as Plain Old Telephone Service (POTS), or a residential Voice over IP (VoIP) service. Universal phone number service gateway 180 preferably obtains indication 239 at the time of the phone service subscription. In one embodiment, universal phone number service gateway 180 obtains indication 239 through a service ordering process by an operator.

By way of example only, in one embodiment, telephone system 234 provides a mobile phone service, such as GSM service. In this embodiment for example universal phone number service gateway 180 obtains indication 239 from a Home Location Register (HLR) or a Home Subscriber Server (HSS).

In another embodiment, telephone system 234 provides an Instant Message based phone service such as, but not limited to Google Talk, or Yahoo Phone In. In this embodiment, universal phone number service gateway 180 may obtain indication 239 from an Instant Message Presence Server for example.

In a further embodiment, telephone system 234 provides a phone service based on IP Multimedia Subsystem (IMS). In this embodiment, universal phone number service gateway 180 may for example obtain indication 239 from IMS. In another embodiment, universal phone number service gateway 180 obtains indication 239 from a Proxy Call Session Control Function (P-CSCF) serving telephone 210.

In one embodiment, universal phone number service gateway 180 obtains an indication 239 periodically, such as every 2 minutes, 20 minutes or 2 hours. In one embodiment, universal phone number service gateway 180 obtains an indication 239 at a random time. In one embodiment, universal phone number service gateway 180 obtains an indication 239 when the location of telephone 210 has changed. In another embodiment, universal phone number service gateway 180 obtains indication 239 when the presence status of a phone number has changed.

Figure 3:
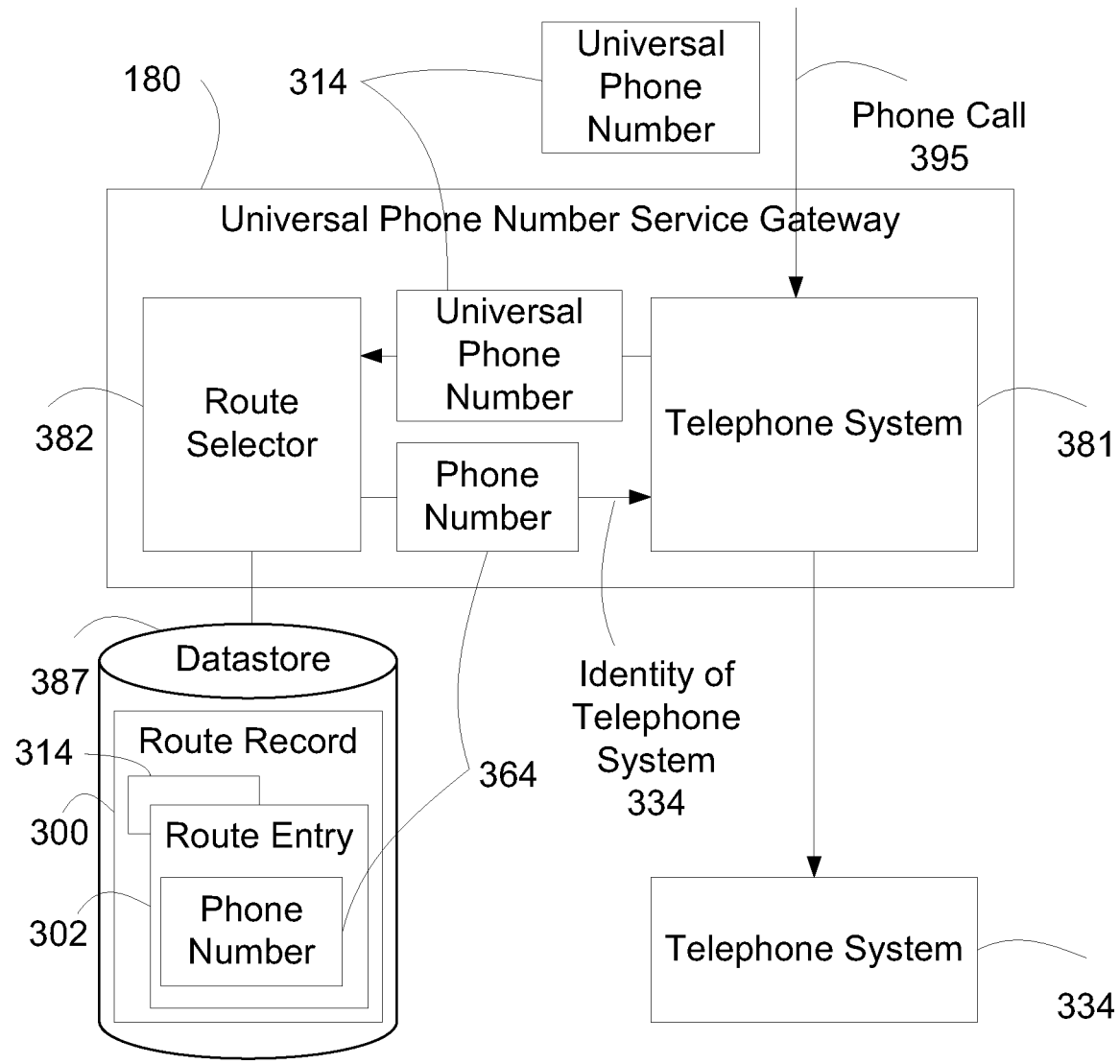
FIG. 3 illustrates a universal phone number service in accordance with at least one aspect of the present invention.

Now referring to FIG. 3 an example of a process of routing a phone call by a universal phone number service gateway 180 is illustrated. Universal phone number service gateway 180 includes telephone system 381 and route selector 382. Telephone system 381 receives a phone call 395 destined for universal phone number 314. Telephone system 381 queries route selector 382 for a routing decision by sending universal phone number 314 to route selector 382.

Route selector 382 receives universal phone number 314. In one embodiment, route selector 382 connects to datastore 387. Datastore 387 includes route record 300 associated with universal phone number 314.

Figure 4:
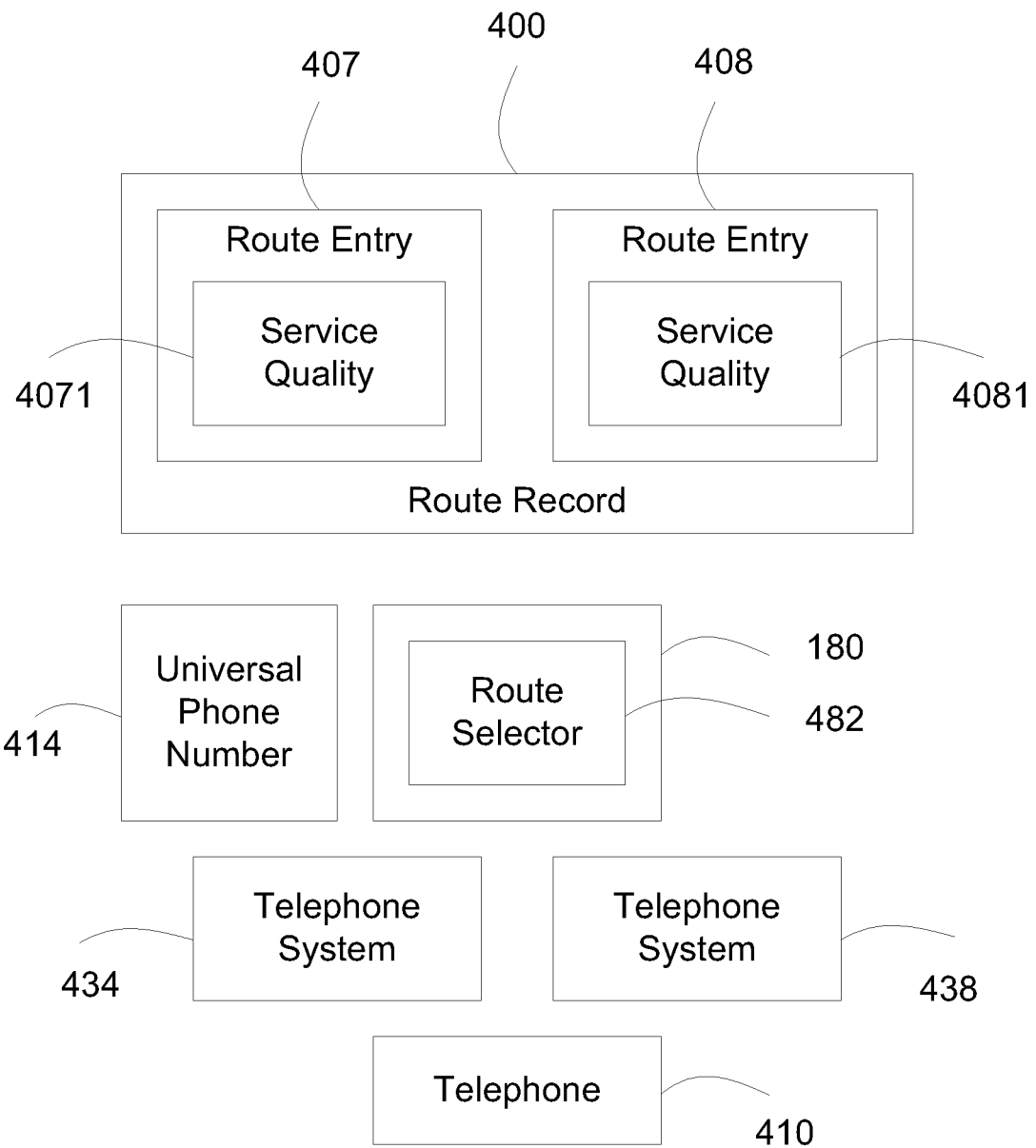
FIG. 4 illustrates a universal phone number service in accordance with at least one aspect of the present invention.
Figure 5:
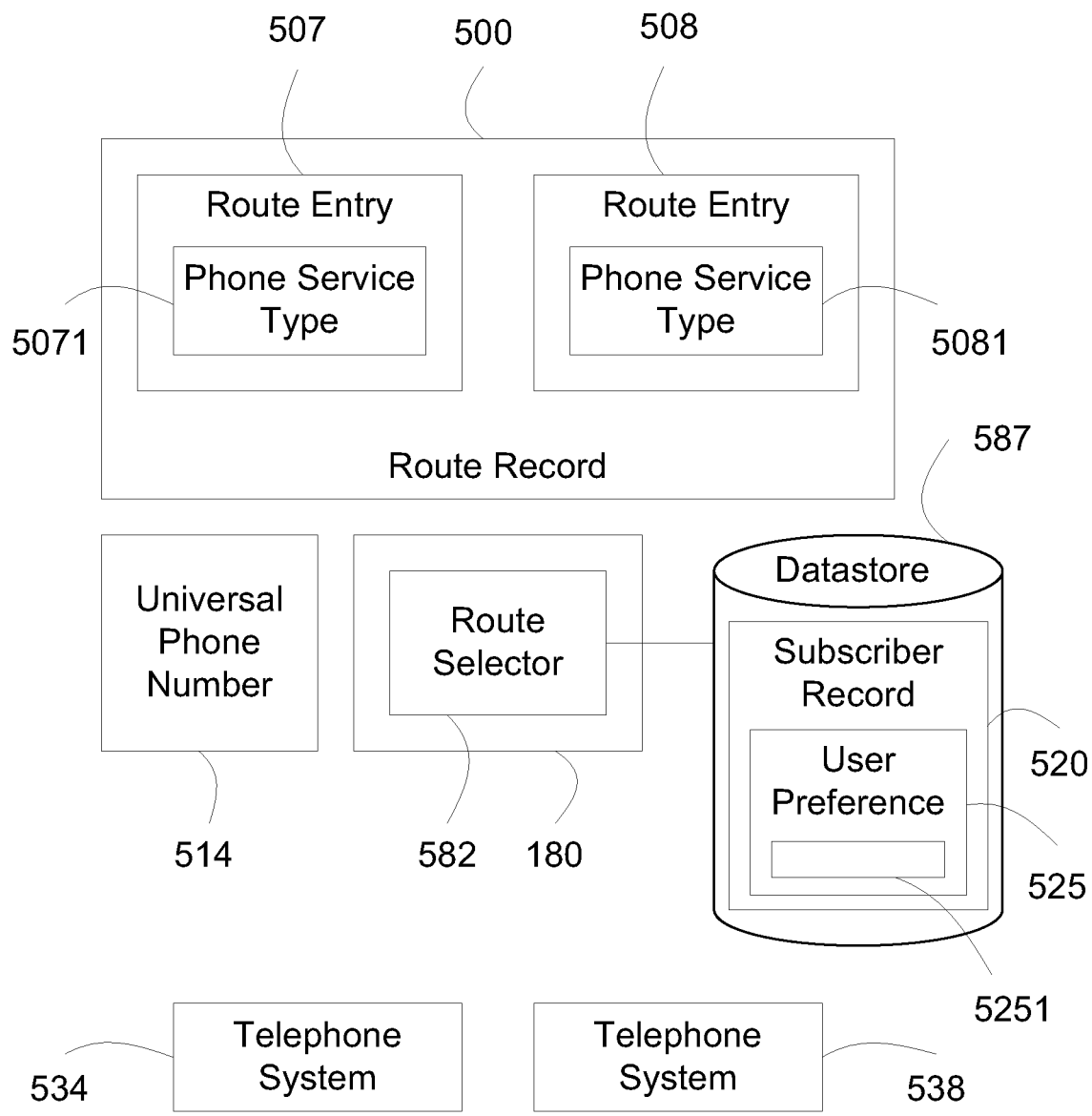
FIG. 5 illustrates a universal phone number service in accordance with at least one aspect of the present invention.
Figure 6:
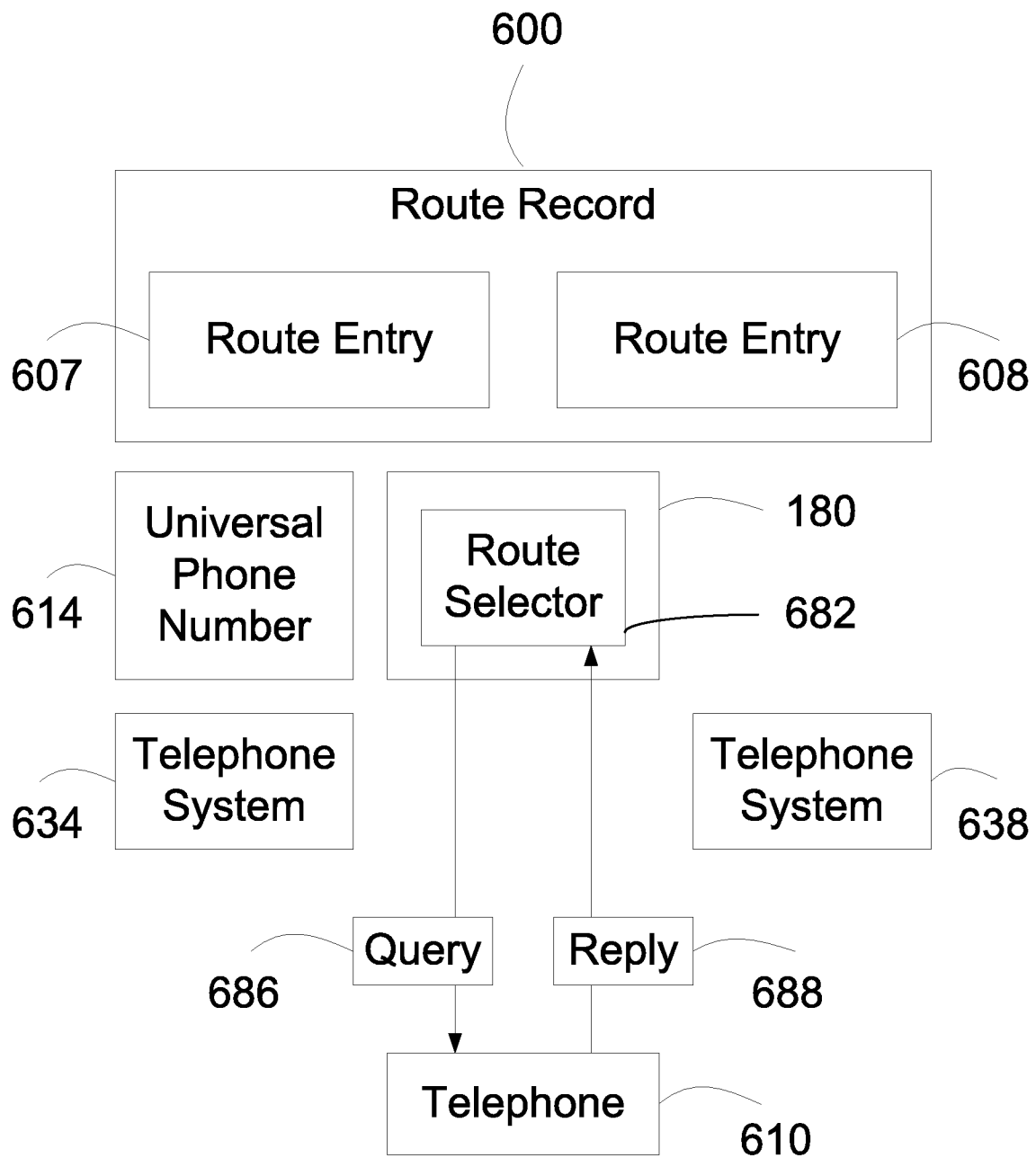
FIG. 6 illustrates a universal phone number service in accordance with at least one aspect of the present invention.

Route selector 382 selects route entry 302 in route record 300 in accordance with processes further exemplified and illustrated in FIGS. 4, 5 and 6. Route entry 302 includes phone number 364 and identity of telephone system 334. Route selector 382 sends phone number 364 and identity of telephone system 334 to telephone system 381. Telephone system 381 routes phone call 395 to telephone system 334 with phone number 364.

Route selection may be based on a variety of criteria such as, but not limited to service quality, user preference, user input and the like. Now referring to FIG. 4, a process of selecting a route entry based on service quality is illustrated. In this embodiment, route record 400 is associated with universal phone number 414 and preferably includes route entries such as route entries 407 and 408. Route entry 407 includes identity of telephone system 434 and route entry 408 includes identity of telephone system 438. Telephone 410 is associated with universal phone number 414.

In one embodiment, route entries 407 and 408 include respective service qualities 4071 and 4081. The service qualities 4071 and 4081 respectively indicate a voice quality of a phone call routed through telephone systems 434 and 438 to telephone 410.

Service qualities 4071 and 4081 may represent various attributes. In one embodiment, service qualities 4071 or 4081 may represent the predicted signal strength of the radio link between a cellular telephone system 434 or 438 and telephone 410. For example, service quality 4071/4081 may be considered "good" if the predicated signal strength is above 20 dB-microvolts per square meter ($dB\mu V/m^2$); "fair" if the predicted signal strength is between 10 to 20 $dB\mu V/m^2$; and "poor" if the predicted signal strength is below 10 $dB\mu V/m^2$.

In another embodiment, service quality 4071/4081 represents the average packet loss rate in a VoIP-based telephone system 434/438 respectively. For example, service quality 4071/4081 may be considered "good" if the predicted packet loss rate is below 1 percent; "fair" if the average packet loss rate is between 1-5 percent; and "poor" if the predicted packet loss rate is above 5 percent. In other embodiments, service quality 4071/4081 may represent the predicted jitter or predicted packet delay for the routed phone call.

In another embodiment, service quality 4071/4081 may represent the current network traffic load of a circuit switching based telephone system 434/438. For example, service quality 4071/4081 may be considered "good" if the current network traffic load is below 20 percent; "fair" if the current network traffic load is between 20-80 percent; and "poor" if the current network traffic load is above 80 percent.

In another embodiment, route selector 482 queries for service quality 4071/4081 from telephone systems 434/438. Route selector 482 compares service quality 4071 and service quality 4081. For example, service quality 4071 may be found "fair" and service quality 4081 found "good". Route selector 482 determines service quality 4081 is better and selects route entry 408 based on service quality 4081.

Now referring to FIG. 5 a process of selecting a route entry based on user preference is illustrated. In accordance with this embodiment, route record 500 is associated with universal phone number 514. Route record 500 includes route entry 507 associated with telephone system 534 and route entry 508 associated with telephone system 538. Subscriber record 520 is associated with universal phone number 514, and includes a user preference 525. In one embodiment, user preference 525 includes a preferred phone service type 5251. Route entries 507 and 508 include phone service types 5071 and 5081 respectively.

In one embodiment, universal phone number service gateway 180 obtains phone service types 5071 and/or 5081 as an indication 239 as illustrated in FIG. 2. For example, preferred phone service type 5251 may be "mobile phone services". In one scenario for example, wherein phone service type 5071 is "IM-based phone service" and phone service type 5081 is "mobile phone service", route selector 582 determines that phone service type 5081 matches preferred phone service type 5251; route selector 582 selects route entry 508.

In one embodiment, user preference 525 includes a preferred phone service type associated with a time. Route selector 582 connects to a clock that indicates the current time of day. Route selector 582 selects route entry 508 whose phone service type 5081 matches the preferred phone service type and the associated time matching the current time of day.

Now referring to FIG. 6 a process of selecting a route entry based on user input is depicted. In accordance with one embodiment route record 600 is associated with a universal phone number 614. Route record 600 includes route entries such as for example route entry 607 associated with telephone system 634 and route entry 608 associated with telephone system 638. Telephone 610 is associated to universal phone number 614. It will be apparent to those skilled in the art route record 600 may include multiple route entries.

A universal phone number service gateway 180 includes route selector 682. Route selector 682 connects to telephone 610. In one embodiment, route selector 682 connects to telephone 610 over a network such as, but not limited to a network or cellular network; or using a message service such as, but not limited to paging service, Short Message Service, Multimedia Messaging Service (MIMS) or Instant Messaging (IM) service.

Route selector 682 sends a query 686 to telephone 610 for the selection of a telephone system. Query 686 includes information about telephone systems 634 and 638, such as the identities of telephone systems 634 and 638. By way of examples, route selector 682 may use a Short Message Service (SMS) or an IM service to send query 686; or route selector 682 may send query 686 using a network or other protocol such as a proprietary protocol. Telephone 610 receives query 686. In one embodiment, telephone 610 includes a graphic user interface (GUI) such as but not limited to a display screen (not shown). Telephone 610 displays the identities of telephone systems 634 and 638 on the GUI.

Telephone 610 provides input means, such as a dialpad, navigation keys or stylus, for a user to select a telephone system. In this illustration, telephone 610 receives from the input means that the user has selected telephone system 638. Telephone 610 sends a reply 688 to route selector 682 indicating the selection of telephone system 638. Route selector 682 receives reply 688. Based on the indicated telephone system 638, route selector 682 selects route entry 608.

In accordance with one embodiment, route selector 682 may select a route entry 608 based on phone call type, such as a voice-only, or a video phone call. In another embodiment, a route entry 608 includes a plurality of phone call types supported by the associated telephone system. Route selector 682 in this embodiment selects a route entry 608 whose supported phone call types include the phone call type of the phone call.

In another embodiment, a preferred phone service type is associated with a caller identity. Route selector 682 selects a route entry 608 whose phone service type matches the preferred phone service type and the caller identity of phone call matches the associated caller identity.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system, comprising:
a single telephone of a user, the single telephone associated with a universal phone number and plural phone numbers,
the single telephone connected to a first telephone system of plural telephone systems to receive a first telephone service, the first telephone system associated with a first phone number of the plural phone numbers,
the single telephone further connected to a second telephone system of the plural telephone systems to receive a second telephone service, the second telephone system associated with a second phone number of the plural phone numbers, and
the single telephone associated with a user preference indicating a preference for the first telephone service, wherein the user preference is associated with the universal phone number and the plural phone numbers,
wherein in response to a phone call placed to the single telephone using the universal phone number, the single telephone receives the phone call from the first telephone system associated with the first telephone service matching the user preference,
wherein the universal phone number is associated with a universal phone number service gateway,
wherein the universal phone number service gateway is associated with at least one telephone network and comprises a route selector, and is associated with a datastore, the datastore comprising a memory and a database, the datastore further comprising a route record associated with the universal phone number and a subscriber record associated with the universal phone number, the subscriber record comprising the plural phone numbers and the plural telephone systems associated therewith,
wherein the universal phone number service gateway is operable to select a subscriber record based on a selected one of plural phone numbers and is further operable to select a route record based on the universal phone number associated with the selected subscriber record,
wherein the route selector is operable to select the route record to route an incoming call based on the user preference using the telephone system associated with the selected one of the plural phone numbers to the single telephone associated with the universal phone number.

2. The system according to claim 1 wherein the plural telephone systems are selected from a cellular phone system, a W-CDMA phone system, a VoIP phone system, an Instant Message based phone system, a public phone system, a corporate phone system and a residential phone system.

3. The system according to claim 1 wherein the at least one telephone network is selected from a public telephony network, voice over IP network (VoIP), cellular telephony network, a corporate telephone network and an Instant Message based telephone network.

4. The system according to claim 1 wherein the telephone is a land-line telephone or a cellular telephone.

5. The system according to claim 1 wherein the universal phone number is selected from a public telephone number, a corporate telephone number and an Instant Message user identity.

6. The system according to claim 1 wherein the universal phone number service gateway is operable to create a route entry comprising the selected one of the plural phone numbers and the telephone system associated therewith.

7. The system according to claim 1, wherein the universal phone number is associated with the universal phone number service gateway,
- wherein in response to receiving the phone call placed to the single telephone using the universal phone number, the universal phone number service gateway:
  - selects the first telephone system associated with the first telephone service matching the user preference, and
  - routes the phone call to the first telephone system.

\* \* \* \* \*